United States Patent
Kilian et al.

(10) Patent No.: US 7,540,823 B2
(45) Date of Patent: Jun. 2, 2009

(54) DUAL-CLUTCH TRANSMISSION WITH INTEGRATED ELECTRIC MACHINE AND UTILIZATION THEREOF

(75) Inventors: Stefan Kilian, Friedrichshafen (DE); Rafel Pascual, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 394 days.

(21) Appl. No.: 11/493,255

(22) Filed: Jul. 26, 2006

(65) Prior Publication Data
US 2007/0022835 A1 Feb. 1, 2007

(30) Foreign Application Priority Data
Jul. 28, 2005 (DE) .................... 10 2005 035 328

(51) Int. Cl.
*B60K 1/02* (2006.01)
*F16H 3/08* (2006.01)

(52) U.S. Cl. ............................. 477/3; 74/331
(58) Field of Classification Search ............ 477/3, 477/5; 74/329, 330, 331, 340; 180/65.2, 180/65.3, 65.4
See application file for complete search history.

(56) References Cited

U.S. PATENT DOCUMENTS

| | | | |
|---|---|---|---|
| 6,490,945 B2 * | 12/2002 | Bowen | 74/339 |
| 6,634,247 B2 | 10/2003 | Pels et al. | |
| 6,691,808 B2 * | 2/2004 | Stenvall et al. | 180/65.2 |
| 7,082,850 B2 * | 8/2006 | Hughes | 74/329 |
| 7,125,362 B2 * | 10/2006 | Beaty et al. | 477/3 |
| 7,231,843 B2 * | 6/2007 | Gumpoltsberger et al. | 74/329 |
| 2002/0082134 A1 * | 6/2002 | Hirt et al. | 477/3 |

FOREIGN PATENT DOCUMENTS

| DE | 3527390 | * | 2/1987 |
|---|---|---|---|
| DE | 3546454 | * | 2/1987 |
| DE | 101 33 695 A1 | | 3/2002 |
| DE | 10231547 | * | 1/2004 |

* cited by examiner

*Primary Examiner*—Roger Pang
(74) *Attorney, Agent, or Firm*—Davis & Bujold, P.L.L.C.

(57) ABSTRACT

New alternatives for integration of electric machines (EM1 to EM6) in an extensively integrated dual-clutch transmission (1) having one dual clutch (2), one first input shaft (8) designed as a hollow shaft and one second input shaft (9) co-axially supported in the first input shaft (8), the same as a first countershaft (10) designed as a hollow shaft and a second countershaft (11) co-axially supported. The possibilities of construction of such dual-clutch transmission are improved, and new areas of use under limiting installation space conditions are disclosed. The efficiency of the same, relative to certain possible uses, is optimized by adequate location of at least one electric machine (EM1 to EM6) and using it for a multiplicity of modes of operation are proposed.

6 Claims, 1 Drawing Sheet

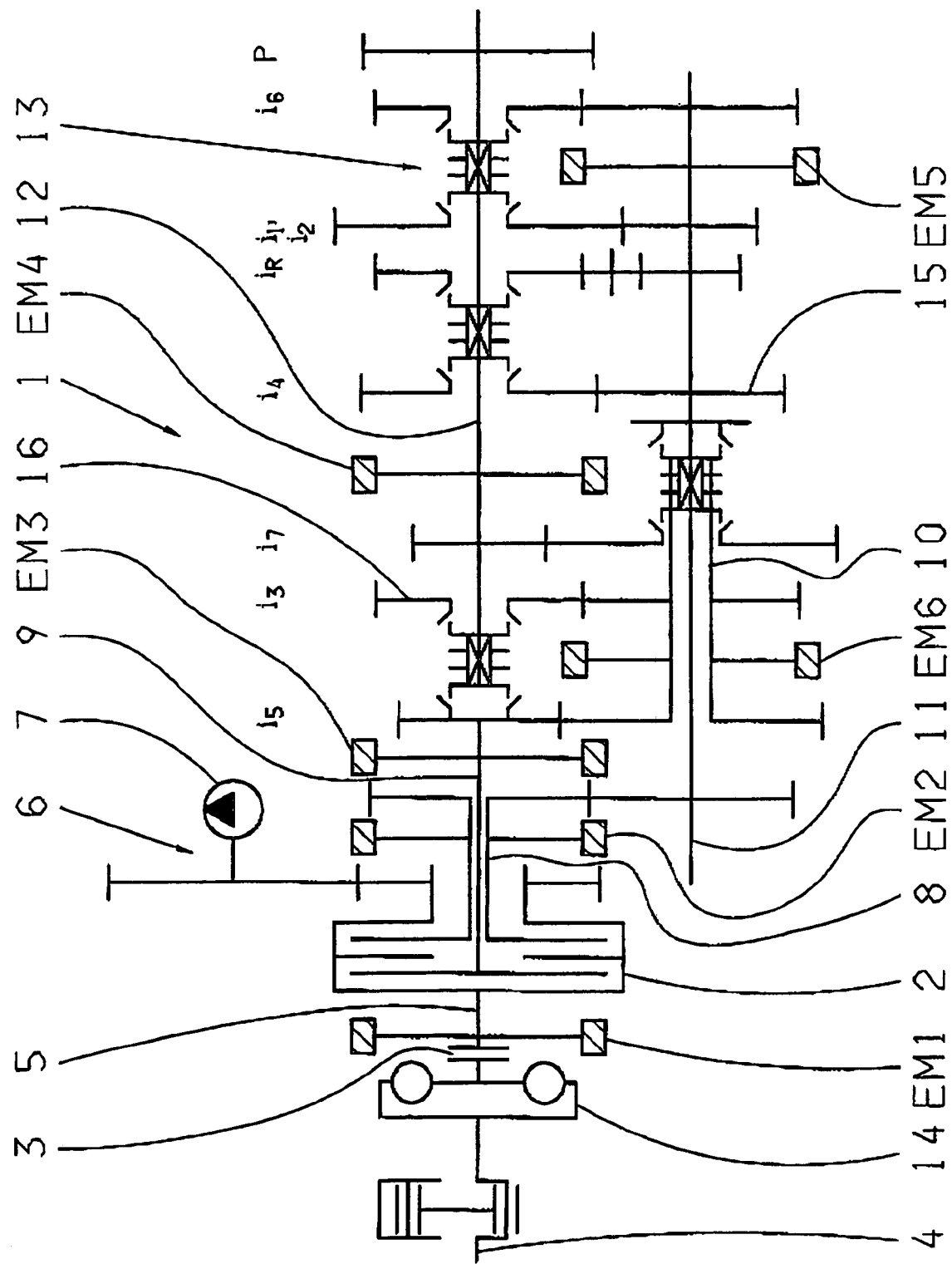

DUAL-CLUTCH TRANSMISSION WITH INTEGRATED ELECTRIC MACHINE AND UTILIZATION THEREOF

This application claims priority from German Application Serial No. 10 2005 035 328.2 filed Jul. 28, 2005.

FIELD OF THE INVENTION

The invention concerns a dual-clutch transmission and a method for utilization of the dual-clutch transmission.

BACKGROUND OF THE INVENTION

For different purposes, it has been known for a long time to situate one or more electric machines in or on a transmission. The applications are basically divided in two groups: 1) the electric machine or machines can perform the tasks of electromotive actuators for shifting transmission gears, thus effecting the torque flow through the transmission without feeding even one torque to a shaft, and 2) one or more electric machines in a transmission can feed a torque to a transmission shaft and/or receive it from a transmission shaft by a generative operation.

DE 101 33 695 A1 and US 2002/033059 A1 disclose dual-clutch transmissions having an integrated electric machine available, which can be located at different points in the transmission, but always acting upon an input shaft. The publications have disclosed multiple different developments and a number of possible manners of using the electric machine. The possible synchronization of transmission elements for the shifting of gears, for example, is actuated by the electric machine. Likewise proposed are possible modes of cold starting and of hot starting of an internal combustion engine connected with the transmission, the same as the recovery of electric energy by a generator operation of the electric machine. For the purpose, the electric machine, existing in the transmission, is energized with torque from the internal combustion engine, one other electric motor or also by the energy of a rolling vehicle.

It is further mentioned that the power of an electric motor existing in the transmission can be used for working together with the prime mover, situated outside the transmission thus to increase the maximum power that can be called for, and the maximum torque that can be called for. It finally says that the electric motor, existing in the transmission, can also be used as an alternative drive whereby the possibility of travel results without participation of the internal combustion engine or any other main engine existing outside of the transmission. However, both DE 101 33 695A1 and US 2002/033059 A1 refer exclusively to dual-clutch transmissions in which at least one gear can be automatically shifted by way of at least one actuator. No suggestions are made for dual-clutch transmission which offer the possibility of entirely manual shifting without using an actuator for automatically shifting or for dual-clutch transmissions which entirely serve the purpose without structurally providing an actuator for automatic shifting. The different alternatives of the embodiments disclosed in DE 101 33 695 A1 and US 2002/0033059 A1 further have in common an electric machine provided in the transmission always acts upon an input shaft or that at least one transmission input shaft is always connectable with the electric machine. Although different structures are proposed in which the electric machine is not directly on an input shaft of the transmission and also does not act directly thereupon, the electromotively applied torque is ultimately always transmitted to the transmission input shaft or received by it in case of generative operation of the electric machine.

Certain disadvantages result from this in relation to maximum possible efficiency. In a vehicle in the gliding operation, that is, during a power-off propulsion phase, when kinetic energy of the vehicle is received via the wheels thereof and introduced in the transmission, it was worth the effort already to receive the power as soon as possible, for example, in the area of the transmission output shaft and not to pass it through the whole transmission subject to losses. In addition, it would be desirable if the clutches could be shifted so that, for example, in case of recovery of electric energy during rolling of the vehicle, the shafts are not needed for the torque flow from the wheels of the vehicle to the electric machine or machines, are not actuated and, accordingly cause little or no power loss. But this is not possible, according to the prior art, since the electric motor or generator always acts upon one input shaft of the transmission.

Together with the stated problem of an improved arrangement of one or more electric machines in a mechanical transmission for reducing the power losses in relation to certain modes of operation and of employment of the motor or motors, it is to be taken into account that for the spatial layout of a vehicle, a transmission is a critical part on which are placed a number of requirements relative to weight, gravity center, geometry, location, number and intensity of the heat-generating components and others.

With this background, it is desirable to find new possibilities for spatial integration of one or more electric machines in one transmission. This is all the more so in the case of a dual-clutch transmission, since the transmissions are often provided for utilizations which place specially high requirements on the operation, the reliability and the degree of efficiency of the transmission. Besides, in their original form without integrated electric machines, dual-clutch transmissions often tend to have a great weight and volume compared to other types of transmissions.

Within the scope of this application, and insofar as not expressly defined otherwise, the expression "electric machines" always comprise those electric machines which can be electromotively and generatively operated.

Special structures of dual-clutch transmissions have already been developed which reduce the installation space required in the sense that several shafts, having similar functions, are locally integrated. At least one hollow shaft is provided for the purpose in which a solid shaft is rotatably supported. This structure offers considerable advantages also in relation to the needed installation space of the dual clutch, since a separately controllable introduction of torque in both transmission input shafts is possible without interposing additional transmission elements for distributing the torque among different shafts. Moreover, both clutches of the dual-clutch transmission can be integrated in the smallest space in an advantageous and a space-saving manner. In addition, if several countershafts, preferably two, are likewise spatially integrated with one countershaft being designed as a hollow shaft in which one countershaft designed as a solid shaft is rotatably supported, especially a small transmission having comparatively several ratio steps are possible which, in many cases, permit the use of dual-clutch transmissions and the utilization of specific advantages thereof.

Precisely in the multi-gear transmission optimized with regard to installation space and weight with several hollow shafts each of which accommodates rotatably supported solid shafts, it is of special advantage if by special forms of the integration of electric machines in the transmission, new possible applications are created which allow equipment of the transmissions with electric machines even in extensively limited or preset installation spaces and also allow, when possible, another efficiency-optimized employment of the electric machines.

With this background, the problem on which the invention is based is to propose new possibilities for integrating electric machines in extensively integrated dual-clutch transmissions in order to disclose new fields of employment for such aggregate combinations under limiting conditions of installation space. Moreover, by adequate arrangement of the electric machine or machines, there is obtained an improvement of the efficiency of the electric machines at least relative to certain possible applications of the same.

SUMMARY OF THE INVENTION

The invention is based on the knowledge that the possible integration of one such transmission in an existing and limited installation space can be clearly improved when it is possible to find hitherto unknown possibilities of integration of at least one electric machine in such a dual-clutch transmission. The invention is further based on the knowledge that by using hitherto unused sites for integration of at least one electric machine in one transmission, for certain fields of use of the electric machine is created the condition for minimizing the power losses of the transmission thus to optimize the total efficiency.

Accordingly, the invention is based on a dual-clutch transmission having a multiplicity of shiftable gears and two input shafts of which a first input shaft is designed as a hollow shaft and a second input shaft is designed as a solid shaft, the latter being situated in the first input shaft support relative thereto. Secondly, both input shafts are in a position to and provided for transmitting a torque from one prime mover to the dual-clutch transmission, which the prime mover is a reciprocating engine with internal combustion. In addition, the dual-clutch transmission has one co-axial dual clutch, one output shaft and at least one first countershaft designed as a hollow shaft which rotatably supports an accommodated second countershaft.

The invention thus relates to a special structure of a dual-clutch transmission, especially well suited for installation in cramped space conditions and, therefore, can be advantageously integrated in motor vehicles. By "co-axial dual clutch" is to be understood here as a dual clutch comprising two separately shiftable clutches which can optionally relay a torque introduced on the input side to its respective output side. The output sides of the two clutches of the dual clutch are respectively connected with the hollow input shaft of the transmission and with the input side of the transmission co-axially supported therein. It is unimportant here whether the dual clutch is accommodated in a common housing with the remaining elements of the transmission or in a separate housing.

The combination of both transmission input shafts disposed co-axially to each other with a hollow shaft and a solid shaft rotatably situated therein also includes alternatives in which the latter shaft has for its part one axial hole which can accommodate one other shaft or also a coolant flow. The chosen designations serve for each differentiation of the shafts and are not to be understood in the sense that the solid shaft can have no axial rupture.

For a solution of the stated problem, in addition, it is provided that at least one electric machine is designed and situated so as to be able to introduce a torque directly at least on the input side of the dual clutch and/or in one of the two input shafts of the dual-clutch transmission and/or in at least one transmission countershaft and/or in at least the output shaft of the dual-clutch transmissions or to receive it.

By the expression "direct introduction or reception of a torque by the electric machine" is to be understood that the latter, for example, with its movable part, is non-rotatably connected with the transmission shaft or input side of the dual clutch so that the axes of rotation of the shaft of the electric machine lie on one line with the transmission shaft or input side of the dual clutch. Alternatively, via inserted transmission components having no other function to perform within the operation space of the transmission, the motor can also act upon one of the transmission shafts or input side of the dual clutch. An electric machine acting by way of its own transmission, of a belt, of a chain or of a pair of gear wheels upon a transmission shaft or input side of the dual clutch, consequently according to definition, acts directly upon the transmission shaft or the input side of the dual-clutch while, for example, an electric machine which, in this sense, acts directly upon a countershaft of the transmission, does not act directly upon an input shaft or the output shaft.

Thus a dual-clutch transmission, constructed in the proposed manner, stands out, having considerably increased design freedom and particularly by the possibly improved adaptation to the existing or preset space conditions. Different installation sites for the electric machine or machines have, in addition, different typical rotational speed ratios. By an increase of the number of installation sites, in the practice in many cases, it is possible to achieve or at least facilitate a good adaptation between the electric machines and the dual clutch. This applies all the more so when the dual-clutch transmission has been essentially preset with regard to its structural features, that is, an existing transmission sketch, for example, is to be integrated and, at the same time, can be referred to a limited pallet of standardized electric machines.

According to a development of the invention, the dual-clutch transmission is configured so that all gears can be strictly manually shifted and particularly that no separate actuators are provided for automatic shifting of gears.

When the dual-clutch transmission can perfectly and mechanically shift all gears without using an actuator for automatically shifting at least one gear serves the purpose, then expensive safety shifts to erroneous electric functions or for a possible failure of electric components or actuators can be eliminated to a great extent, but the expense needed therefor at least can be considerably reduced.

According to a first development of the invention, when the minimum electric machine is arranged so that it can act immediately upon the input side of the co-axial dual clutch, it is thereby possible to place the electric machine outside of the transmission operation space or the clutch operation space accordingly offering the possibility of an assembly outside the transmission housing. Some possible advantages of this development are a particularly easy implementation in an existing dual-clutch transmission draft, a specially good access for eventual maintenance or service works and a potentially better cooling of the electric machine.

From the internal combustion engine to the input shaft of a dual clutch that interacts directly with an electric machine in a torque transmission, it is possible to obtain very small power losses in a generator operation of the same. When the vehicle is stationary, this offers special advantages when, for example, in an extensively discharged battery after a forced start, a minimal loading of the battery is first to be ensured so as to absolutely guarantee a safe participation in street traffic. The advantage of small possible power losses also applies to the use of the electric machine for starting the prime mover.

A preferred development of the arrangement of the just proposed invention is characterized by the fact that at least one other clutch is provided which makes an optional separation of the prime mover from the electric machine possible. In this design, the electric machine, in a starting operation of the internal combustion engine, can first be accelerated to a specific rotational speed so as subsequently to make a great initial torque available by closing the clutch using the energy fed to the idle mass of the rotating parts.

In a cold start of the internal combustion engine, it is also possible, as needed, by closing at least one of the clutches of the dual clutch and shifting the transmission to a state in which no force is transmitted to the vehicle wheels, to use part of the transmission as flywheel mass and set it in rotation in order, for example, to overcome a strong starting torque of the internal combustion engine.

In addition, it is possible to clearly reduce the load acting upon the electric machine by a preceding start thereof without load, thereby clearly reducing the construction volume of the electric machine without impairing its capacity for starting the internal combustion engine. Finally, when the clutch is open, the electric machine can also be used advantageously for the internal combustion engine to switch the vehicle or as auxiliary drive, since multiple possibilities of rotational speed ratio are given by the rear-mounted, dual-clutch transmission. Correspondingly, high power losses are, of course, to be expected here.

According to a second development of the invention, when the electric machine acts directly upon an input shaft of the dual-clutch transmission, this offers certain advantages, precisely in the case of two input shafts co-axially supported in each other, relative to an effective utilization of the existing installation space so that in many cases it is entirely or extensively possible to omit a modification of the housing in this connection. Besides, the above described advantage of the first alternative of the invention and the further development thereof in essence also apply to this alternative. But here a separate clutch can be eliminated between the electric machine and the prime mover since the dual clutch is located between the electric machine and the internal combustion engine. However, the idle mass, which has to be set to rotate during start of the electric machine, is here tendentially greater, since the mass of the input shaft has to be accelerated also.

In addition, in a cold start at low outside temperatures, considerable power losses result due to high viscosity of the transmission oil. Whether at the same time the electric machine is to act upon the hollow shaft or upon the solid shaft of both transmission input shafts, is to be decided with reference to the dual-clutch transmission concretely in question and to the specific properties thereof. It is obviously possible to also provide electric machines on both transmission input shafts, which can optionally be separately used and/or combined.

A third development of the invention provides, on the other hand, that the minimum electric machine acts directly upon the output shaft or one of several output shafts of the dual-clutch transmission. Hereby the number of transmission elements rotating along can be kept especially low and thus the losses due to friction and acceleration of idle masses when the vehicle, for example, rolls or moves beneath a gradient and the electric machine is used in the generator operation for producing electric energy. At the same time, as result of great torques possible in certain designs for electric machines, it can also be advantageous to make a slow and accurate switching possible with the aid of an electric machine acting directly upon the output shaft. Finally, under certain circumstances this developments can also be especially suited at medium and high speeds, for example, to serve as sole or supporting drive of the vehicle and thus to maintain constant speed of the vehicle or clearly lengthen the possible rolling distance prior to a foreseeable stop of the vehicle when approaching a still far removed red light or stop sign.

In such cases, the need of energy is very small for maintaining the speed or at least for a detectable reduction of the delay of the vehicle. The internal combustion engine thus works in an extremely unfavorable range of efficiency and can be conveniently disconnected and replaced by the torque prepared by the electric machine.

On the other hand, a fourth development of the invention provides that the minimum electric machine acts directly upon a countershaft of the dual-clutch transmission. Together with possible advantages relative to installations space, this offers the possibility of adjusting in a specially easy manner, by shifting the transmission gears, different ratios for the output shaft and/or for one of the two input shafts, thus optimizing the rotational speed of the minimum electric machine for the current utilization. Whether the electric machine is here to act upon the countershaft designed as a hollow shaft or the one designed as a solid shaft is, in turn, to be decided with reference to the concretely existing dual-clutch transmission and the specific qualities thereof. It obviously is also possible to provide on both countershafts electric machines which can optionally be used separately or combined.

From the above, it results that the proposed embodiments of the invention and the different installation locations or sites of action of the electric machines on the dual-clutch transmission have specific advantages. For a utilization as universal as possible of the possible advantages, it can be important, therefore, to provide at least two electric machines within the dual-clutch transmission or in the area of the dual-clutch transmission. The respective best suited electric machine can be used for the different applications or several electric machines also can be simultaneously operated.

While different sites have been proposed for the arrangement or torque engagement in the dual-clutch transmission of electric machines and the specific advantages of each have been explained, a control device is to be discussed herebelow, which obviously can be also a regulating device and which offers special advantages combined with the above embodiments of the invention.

According to this aspect of the invention, a control device is provided which can control the electric machine or machines so that an internal combustion engine can be started and/or that a recovery can be carried out and/or that it is possible to increase the power of the internal combustion engine and/or that a generator operation of the electric machine or machines is possible and/or that a switching operation of the vehicle can occur with the aid of the electric machine or machines and/or that travel is possible with the aid of the electric machine or machines and/or that rotating parts of the transmission can be synchronized by one or several electric machines.

At the same time, it can be of advantage in the case of a dual-clutch transmission with actuators that the control device can indirectly or directly activate the actuators in the way desired in order, for example, to eliminate torque transfer to the wheels of the vehicle for starting the internal combustion engine.

For transmissions without actuators, however, it is enough that there are sensors which examine the state of the transmission and/or the state of the clutch for the mode of operation respectively selected. It is conceivable here, for example, in the case of unfavorable states of the transmission and/or of the clutch to issue a notice to the drive urging the driver to a manual engagement.

The individually performed functions are basically known and, therefore, need no further explanation. The concrete reaction of the functions depends on the installation site of the electric machine(s) and on the construction and layout of the transmission, the same as of the whole drive train and, accordingly, can only be named in the concrete individual case based on the prevailing marginal conditions. What matters here is only that a central control device, combined with the above mentioned developments of the invention, control and regulate each implemented function. It is possible that the control device be structurally disposed in different modules or be wholly or partly integrated in one other control unit.

After the inventive device and advantages thereof have been described, a method must next be taken up for control of an inventive dual-clutch transmission having a multiplicity of shiftable gears, the dual-clutch transmission, as already mentioned, having two input shafts at its disposal of which one first input shaft is designed as a hollow shaft and one second input shaft as a solid shaft, the latter being rotatably supported in the first input shaft. The shafts are able and provided for introducing a torque from a prime mover in the dual-clutch transmission, which can be a reciprocating motor with internal combustion. The dual-clutch transmission has one co-axial dual clutch, one output shaft and at least one countershaft which, designed as a hollow shaft, co-axially accommodates a second rotatably supported countershaft.

Within the above described transmission arrangement at least one electric machine is designed and disposed so as to be capable of directly feeding a torque at least on the input side of the dual clutch and/or to one of the two input shafts of the dual clutch and/or to at least one transmission countershaft and/or at least to the output shaft of the dual-clutch transmission or receiving it from them. Finally a control device is provided which, on the basis of sensor values and/or manual indications of an operator, selects one of several modes of operation and controls at least the electric machine or machines so that the mode of selected operation becomes active.

This control device can read in the relevant transmission and/or vehicle data respectively available in the concrete alternative of the invention. It is unimportant whether it directly reads in sensor data or uses data of other control units that have been more or less extensively prefabricated. Together with data relative to the transmission, in a strict sense to this also belong other data which contain, for example, statements about the state of the prime mover or information about an indicated or surmised driver's wish.

By means of the data, the control device generator's output signals which, in turn, become operative upon the dual-clutch transmission, for example, by controlling one or more of the electric machines, so that they feed torque to the dual-clutch transmission or to the input side of the dual clutch or receive it therefrom.

The control device further can also send output signals to other modules of the aggregate, such as the motor control of a prime mover to be started. Such a control device optimally combines and simplifies the possibilities resulting from the inventive device also implementing new functions and the fusion in the data services with other aggregates.

If the dual-clutch transmission has no actuators or for certain reasons these are not to be used and an operator extensively manually shifts all gears, it is provided, according to a definition of the method in this connection, that the control device selects the suitable ones among those modes of operation at the momentary transmission shifting position.

A mode of operation where no electric machine is active, obviously can also be selected. In this manner, the advantages of the inventive method can be used to a great extent also in dual-clutch transmissions.

Together with the data already mentioned which are exchanged with other modules or aggregates, it is possible, when needed, to generate messages to the driver by way of his manually requesting to bring the dual-clutch transmission to a certain state so as to make activating a possible mode of operation deemed suitable.

In an alternative development of the method by way of at least one actuator, when the control device can automatically shift to different ratio steps at least one part of the dual-clutch transmission without action of the operator in accordance with read-in data and with the existence of conditions, and the control device for activating the desired mode of operation first controls the actuator so that the dual-clutch transmission is brought to a shifting position advantageous for the mode of operation desired and subsequently the minimum electric machine is controlled so that the desired mode of operation results, then a manual engagement of the operator can be omitted. The comfort in the operation is hereby increased as the availability of different possible modes of operation are improved.

An essential advantage for the use of the above described control device results when a multiplicity of different modes of operation can be selected. In this case, the control device, under at least two of the modes of operation stated herebelow, can select one mode of operation based on read-in data and/or directions and activate the selected mode of operation by way of adequate outputs.

A first mode of operation can produce here no engagement of the control device, that is, produce an outward inactivity of the system and/or reset a previously active mode of operation thus creating the output state or a transmission characteristic which would result without an inventive method or an inventive device.

A second mode of operation can produce a direct start of the prime mover and a third mode of operation can produce a recuperation of kinetic energy to electric energy. A fourth mode of operation can produce a boosting of the action of the prime mover, that is, a strengthening in the same direction of the action of the prime mover by the minimum electric machine. A fifth mode of operation can produce a generation of electric energy while the prime mover rotates. The electric energy is optionally utilizable to supply the main power system and/or to load an energy accumulator. A sixth mode of operation can allow switching of the vehicle by way of the minimum electric machine. A seventh mode of operation makes a motion of the vehicle possible by way of the minimum electric machine and an eighth mode of operation can finally allow the synchronization of rotating parts of the transmission.

The modes of operation are each known per se and, therefore, need no further explanation. Here it is specially advantageous to implement a multiplicity of the modes of operation. This is made at all possible or at least greatly simplified by the control device described on the basis of the central processing capacity thereof and good data engineering fusion.

BRIEF DESCRIPTION OF THE DRAWING

The invention will now be described, by way of example, with reference to the accompanying drawing in which:

The sole FIGURE is a schematized illustration shows a dual-clutch transmission in a drive train of a motor vehicle wherein by way of example different possible action sites of electric machines EM1 to EM6 can be seen on the dual-clutch transmission.

DETAILED DESCRIPTION OF THE INVENTION

A dual-clutch transmission 1 shown in the FIGURE with seven forward gears $i_1$ to $i_7$ and one reverse gear $i_R$ is comprised in one housing (not shown) which can include the housing of a dual clutch 2 having two partial clutches. But the dual clutch 2, the same as an optional added clutch 3, can be lodged in a separate housing. The optional added clutch 3 serves here to interrupt the torque flow between a prime mover 4 designed as an internal combustion engine and the dual-clutch transmission 1.

As has been said, the dual-clutch transmission 1 is tied in a drive train which comprises the prime mover 4, one torsional vibration damper 14, the optional added clutch 3 situated on the input side before the dual clutch 2, the same as the dual-clutch transmission itself. The dual-clutch transmission 1 has a widely known construction with separate gear wheel pairs of fixed wheels 15 and idler wheels 16 which implement each reduction ratio of the transmission. Situated between the gear wheel pairs are coupling device-like sliding sleeves 13 with which each idler wheel 16 can be non-rotatably connected with the respectively associated transmission shaft.

In this FIGURE of the drawing, symbols EM1 to EM6 characterize those sites of component parts of the dual-clutch transmission 1 where, according to the instant invention, at least one of the electric machines EM1 to EM6 can be disposed in a torque-transmitting manner.

As already explained above, in an arrangement of an electric machine on an input side 5 of the dual clutch 2, for starting the prime mover 4, the optional added clutch 3 makes a first time only accelerating possible, the input side 5 of the dual clutch 2 with the parts permanently non-rotatably connected therewith. In this embodiment, this is the outer housing of the dual clutch 2 and an auxiliary aggregate output 6 having an oil pump 7 and comprising an outer toothing on the housing of the dual clutch 2 and a gear wheel meshing therewith; the latter being fastened on a shaft which drives the oil pump 7.

The needed electric starting current and the needed electric maximal power of the electric machine for starting the prime mover 4 can thus be definitely reduced by accumulation of rotation energy particularly in case of a high starting torque of the prime mover 4 in a cold start.

In an arrangement of an electric machine with direct action upon the input side of the dual clutch 2 by the electric machine can also be implemented even without the optional added clutch 3, the functions of direct start of the prime mover 4 of recovery of kinetic energy of the vehicle, of increase, that is, assistance of the prime mover 4 by the electric machine, the same as of supply of an electric main power system during rotation of the prime mover 4.

If the optional added clutch 3 is present in this drive train, the functions of the electric switching in both travel directions of the electromotive motion of the vehicle can be implemented on the input side 5 of the dual clutch 2 by way of the electric machine and of the electromotive synchronization of gear wheel pairs to be shifted.

The dual-clutch transmission 1 has two input shafts 8 and 9 of which a first input shaft 9 is designed as a hollow shaft in which the second input shaft 9 designed as a solid shaft is rotatably supported. Both input shafts 8 and 9 can support the second rotatable part of an electric machine or an electric machine can act directly upon each of the input shafts 8, 9. With such an arrangement of the electric machine or machines, all above mentioned functions can be implemented.

The dual-clutch transmission 1 further comprises two countershafts 10 and 11 of which a first countershaft 10 is designed as a hollow shaft and a second countershaft 11 is designed as a solid shaft rotatably supported in the first countershaft 10. In an arrangement with direct action of one or more electric machines upon one or both of that countershafts 10, 11, all the above mentioned functions can likewise be implemented.

Moreover in many cases, instead of providing one electric machine, it is favorable to provide at least two electric machines which, with adequate layout, can mutually support each other during certain functions and, if needed, perform other functions without cooperation of the other electric machine or machines. Several electric machines offer here not only the possibility of optimally using an optionally existing installation space and of adapting the special individual electric machines, respectively, to specific problems and circumstances, but can also offer a special safety against failures as at least a partly redundant layout.

REFERENCE NUMERALS 1 dual-clutch transmission
2 dual clutch
3 optional added clutch
4 primer mover, internal combustion engine
5 input side of the dual clutch
6 auxiliary aggregate output
7 oil pump
8 first input shaft, hollow shaft
9 second input shaft, solid shaft
10 first countershaft, hollow shaft
11 second countershaft, hollow shaft
12 output shaft
13 coupling device, sliding sleeve
14 torsional vibration damper
15 fixed wheel
16 idler wheel
EM electric machines
$i_1$-$i_7$ forward gears
$i_R$ reverse gear

The invention claimed is:

1. A dual-clutch transmission (1) comprising a multiplicity of shiftable gears, first and second input shafts (8, 9) of which the first input shaft (8) is a hollow shaft and the second input shaft (9) is a solid shaft, the second input shaft (9) being co-axially supported in the first input shaft (8), the first and the second input shafts (8, 9) transmit torque from a prime mover (4) to the dual clutch transmission (1), the dual-clutch transmission (1) has a dual clutch (2), an output shaft (12) and at least a first countershaft (10) which is a hollow shaft and contains a second countershaft (11) rotatably supported in relation thereof, at least one electric machine (EM1-EM6) is situated so as to be capable of at least one of supplying and receiving torque directly to one at least one of an input side (5) of the dual clutch (2), one of the first and the second input shafts (8, 9), at least one transmission countershaft (10, 11) and in at least the output shaft (12); and the electric machine is situated so that the electric machine acts directly upon the input side (5) of the dual clutch (2).

2. The dual-clutch transmission (1) according to claim 1, wherein the dual-clutch transmission (1) is designed so that all the shiftable gears are entirely manually shiftable and no actuators are provided for automatic shifting of the gears.

3. The dual-clutch transmission (1) according to claim 1, wherein at least one other clutch (3) is provided which facilitates optional disengagement of the prime mover (4) from the electric machine possible.

4. The dual-clutch transmission (1) according to claim 1, wherein at least two electric machines are located within the dual-clutch transmission (1).

5. The dual-clutch transmission (1) according to claim 1, wherein a control device controls the at least one electric machine such that at least one of the following is possible: the at least one electric machine starts the prime mover (4); a recuperation can be effected; the at least one electric machine boost power of the prime mover (4); the at least one electric machine generates electricity; the at least one electric machine facilitates a switching operation of a vehicle, the at least one electric machine facilitates motion of a vehicle; and the at least one electric machine facilitates synchronization of parts of the dual-clutch transmission (1).

6. A dual-clutch transmission (1) comprising a multiplicity of shiftable gears, first and second input shafts (8, 9) of which the first input shaft (8) is a hollow shaft and the second input shaft (9) is a solid shaft, the second input shaft (9) being co-axially supported in the first input shaft (8), the first and the second input shafts (8, 9) each transmitting torque from a prime mover (4) to the dual clutch transmission (1), the dual-clutch transmission (1) having a dual clutch (2), an output shaft (12) and at least a first countershaft (10) which is a hollow shaft and contains a rotatably supported second countershaft (11), at least one electric machine (EM1-EM6) being situated so as to be capable of at least one of supplying and receiving torque directly to one at least one of an input side (5) of the dual clutch (2), one of the first and the second input shafts (8, 9), the at least one transmission countershaft (10, 11) and the at least the output shaft (12); and the electric machine acts directly upon the output shaft (12).

* * * * *